June 29, 1954

A. L. STONE ET AL 2,682,102

DRILL PIPE PROTECTOR APPARATUS

Filed June 14, 1949

INVENTORS
ALBERT L. STONE
RODNEY R. WOOD

BY Lyon & Lyon

ATTORNEYS

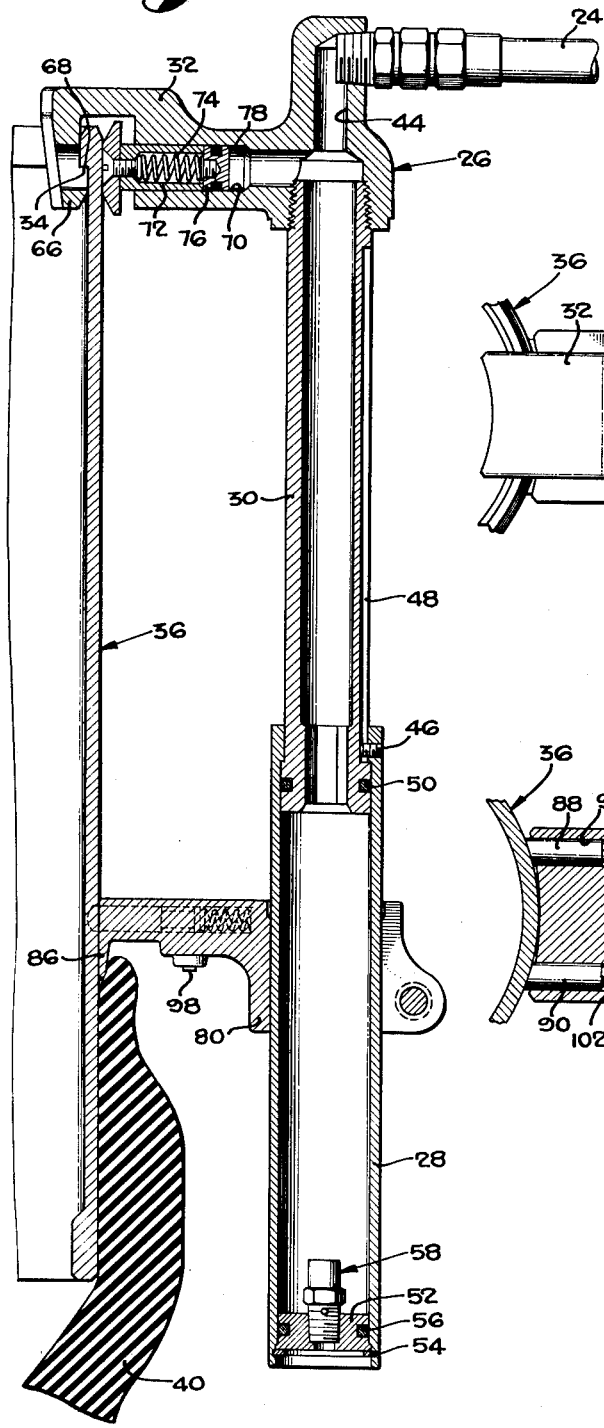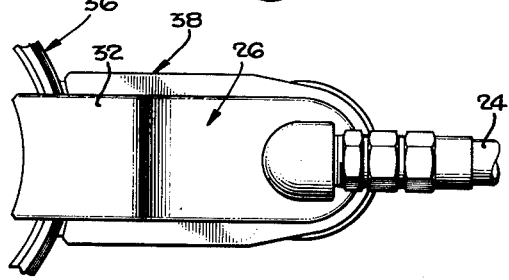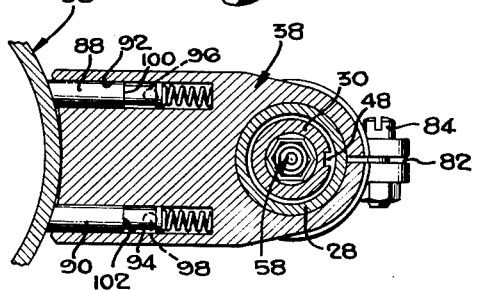

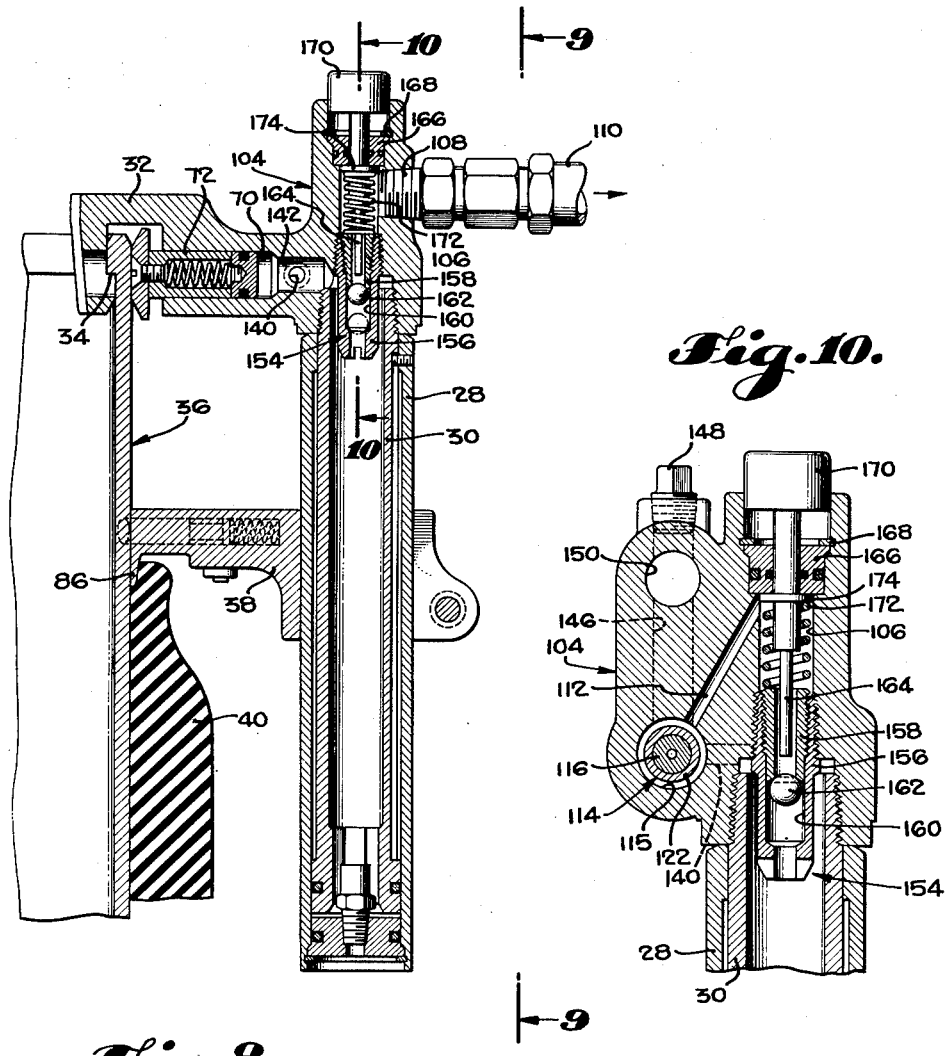

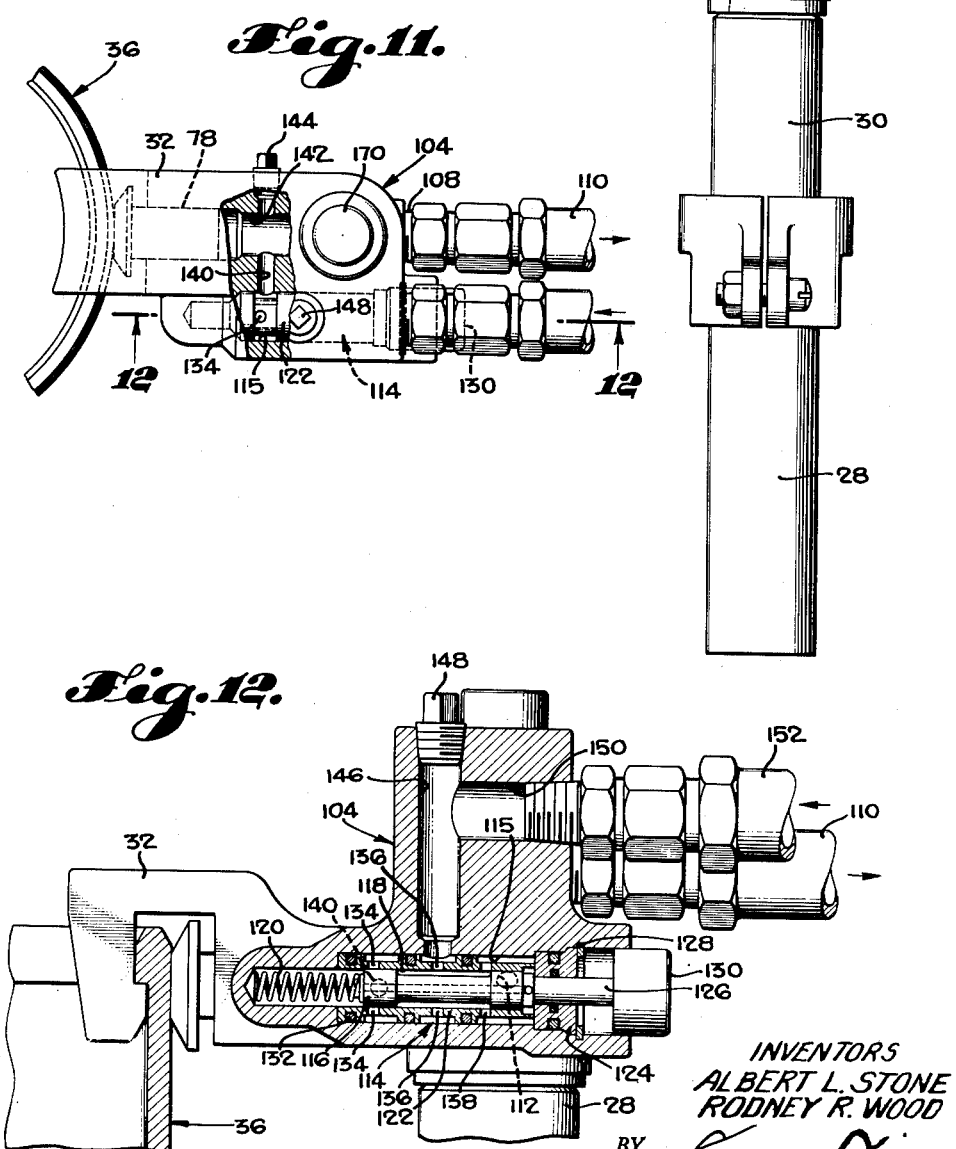

Patented June 29, 1954

2,682,102

UNITED STATES PATENT OFFICE 2,682,102

DRILL PIPE PROTECTOR APPARATUS

Albert L. Stone, Palos Verdes Estates, and Rodney R. Wood, Burbank, Calif., assignors to Byron Jackson Co., Vernon, Calif., a corporation of Delaware Application June 14, 1949, Serial No. 99,074

3 Claims. (Cl. 29—236)

This invention relates to apparatus for installing drill pipe protectors and particularly to apparatus for forcing protectors off of transfer sleeves and onto drill pipes.

It is common practice in the rotary well drilling art, wherein there always exists the problem of wear on the drill pipe and on the metal wall of the casing installed in the well, to provide on said drill pipe at proper intervals resilient protectors, usually composed of rubber or rubber compound. In order that such protectors, which comprise cylinders about the pipe, may tightly grip said pipe to avoid slippage, the protectors are molded with their internal diameters smaller than the external diameter of the pipe, there thus being a requirement that the protectors be stretched to permit their being slipped over the pipe.

As it is generally unfeasible to directly stretch and apply the protector to the pipe without intermediate transfer means, common practice in the art is to first stretch the protector and slip same over a cylindrical metal sleeve having an inside diameter slightly larger than the outside diameter of the drill pipe and to then remove the protector directly from said cylindrical sleeve to the drill pipe. Such cylindrical sleeve transfer means are commonly known as transfer sleeves, and it is with mechanism for removing the protector from the transfer sleeve to the drill pipe that the present invention is concerned.

Several devices have heretofore been used for this purpose comprising, among others, mechanical screw-jack means adapted to push the protector from the transfer sleeve onto the drill pipe by the abutment of pressure rings and the like. However, the difficulty with this and similar expedients is that such means comprise heavy, unwieldy articles. Since frequently a string composed of many stands of drill pipe must be fitted with protectors adjacent each tool joint, and since this entails a lifting of each protector bearing transfer sleeve, a placing of same over the drill pipe, a removal of the protector to the drill pipe, and a removal of the transfer sleeve from the drill pipe, any excessive additional weight which must be applied to the transfer sleeve and used to remove the protector therefrom causes considerable loss of time, increased labor expense, and is productive of accident. Additionally, expedients prior to the present invention, such as the means outlined above, are slow to act and difficult to operate, and prior devices have been not suitable for use with the different sized transfer sleeves necessitated by different sized drill pipe, being rather limited to a single size transfer sleeve.

It is the principal object of this invention to provide means for removing protectors from the transfer sleeve onto the drill pipe, which means is light, easy to handle but yet positive in its operation.

Another of the objects of this invention is to provide such protector apparatus which is not only light, but of such construction and having such operational advantages as to be handy, fast operating, and absent the necessity of a number of adjustments and hand operations by the operator once the apparatus has been affixed to the transfer sleeve, it being a particular feature of the apparatus contemplated by the present invention that said apparatus is actuable by the operator in simple and quick manner to promptly remove the protector from the transfer sleeve, and thus save time at a critical point in the cycle of protector application, i. e., when the transfer sleeve and associated mechanism is suspended about the drill pipe immediately preparatory to removal of the protector onto the said drill pipe.

Another object of this invention is to provide such protector apparatus operable with different sized transfer sleeves so that it is unnecessary to change the protector apparatus to another size to accommodate a changed size of transfer sleeve applicable to a changed size of drill pipe.

A further object of this invention is to provide protector apparatus not only light and handy of use, but compact whereby to minimize possible interference between said apparatus and elements associated with the drill pipe, such as tool joints and the like.

Yet another object of this invention is to provide in the aforesaid apparatus a combination of elements operable to perform the above-described functions, but, whilst doing this, operable to avoid damage to said elements associated with the drill pipe.

Still another object of this invention is to provide said apparatus easily controllable with respect to the protector immediately preceding and during its removal from the transfer sleeve, said protector necessarily being of high strength and therefore requiring considerable pressures and forces in removal from the transfer sleeve onto the drill pipe.

And another object of the invention is to provide means on said apparatus to facilitate its easy and quick removal from the transfer sleeve after the aforesaid operations.

3

Further objects of the invention will appear hereinafter.

In the drawings:

Figure 5 shows an enlarged longitudinal sectional view of the apparatus in the operative position shown in Figure 2.

Figure 6 shows a partial top plan view of said apparatus.

Figure 7 shows a cross-sectional view of the apparatus taken on the line 7—7 of Figure 3.

Figure 8 shows a longitudinal sectional view of a modification in said apparatus.

Figure 9 is a sectional view partially broken away taken on the line 9—9 of Figure 8.

Figure 10 is a longitudinal sectional view taken on the line 10—10 of Figure 8.

Figure 11 is a top plan view of said modification shown partly in breakaway section.

Figure 12 is a sectional view taken on the line 12—12 of Figure 11.

Figure 1:
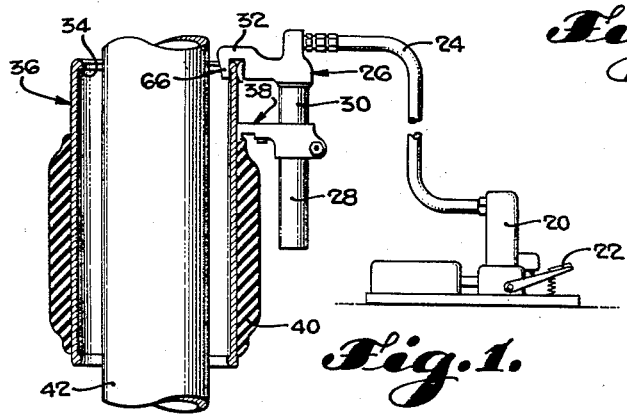
Figure 1 shows a side elevational view of an apparatus incorporating the present invention affixed to the transfer sleeve and in position to exert pressure on a protector to remove same from said transfer sleeve onto the drill pipe.
Figure 2:
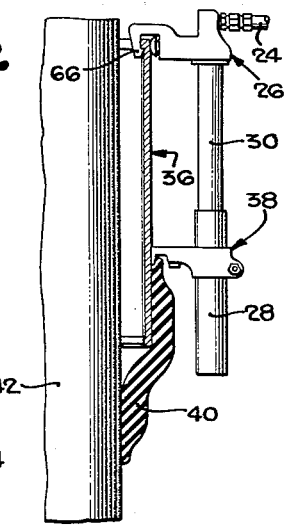
Figure 2 shows a similar enlarged view of said apparatus midway in its protector-removing operation.

Referring to the drawings, and particularly to Figures 1 and 2, the general assembly of the apparatus consists of a source of fluid pressure 20 which may be operated by a foot pedal 22 to deliver fluid through a conduit 24 to a head 26 to force outwardly a cylinder 28 mounted slidably on a stationary plunger 30. Integral with the head 26 is a retaining arm 32 which is adapted to grasp an upper lip 34 of the transfer sleeve 36, and carried by the cylinder 28 is a protector-engaging arm 38 adapted, as shown in Figure 2, to force the protector 40 from the said transfer sleeve 36 to the drill pipe 42 upon the application of fluid pressure.

More particularly, the stationary plunger 30 is threadedly secured to the head 26 into which leads the conduit 24. Said stationary plunger 30 is hollow and open at both ends and forms a continuous passage with the bore 44 in the head 26. Slidable on the plunger and splined thereto through a threaded pin 46 and slot 48 is the said cylinder 28, the outer end of said plunger 30 being sealed to the inner wall of the cylinder 28 by an O-ring 50. A cylinder head or plug 52 closes the outer end of said cylinder 28 and is held in place by a snap ring 54 and sealed by an O-ring 56, thus providing a reactive surface to enable the fluid pressure upon application to slide the said cylinder 28 outwardly on the plunger 30. It will be noted that a check valve 58 is provided associated with the cylinder head 52 to permit bleeding of entrapped air from the cylinder when desired, which comprises a bore 60, a bored plug 62 threadably received in the cylinder head 52, and a spring-loaded ball 64 within said plug adapted to be removed from its seat by the insertion of a suitable tool.

Integral with the head 26 of the apparatus and extending transversely therefrom is provided the arm 32 which includes a hooked or depending portion 66 having a shoulder 68 adapted to cooperate with the lip 34 of the transfer sleeve 36.

4

In order to hold the said arm 32 secured to the transfer sleeve, there is provided a bore 70 in the said arm 32 connecting with decreased diameter to the bore 44 in the head 26 and receiving slidably a plunger 72. The plunger 72 is hollow and is provided with a compression spring 74 which abuts at one end against said plunger and at the other end against a piston 76 slidable in the bore 70 and seatable on the shoulder 78 thereof. Thus, where fluid pressure is lacking, the plunger 72 is spring-urged against the transfer sleeve 36, but upon the admission of fluid pressure into the bore 44, the hollow plunger 30 and the bore 70, the plunger 72 clamps the arm 32 hard about the transfer sleeve 36 to prevent relative movement between the said plunger 30 and transfer sleeve 36.

Adjustably affixed to the cylinder 28 which, as aforesaid, is slidable outwardly on the plunger 30 in response to fluid pressure, is the single projecting arm 38, said arm including a hub portion 80 bored to receive the cylinder 28, split at 82 and provided with a clamping bolt 84. The protector-engaging arm 38 has a lip 86 adapted to insert under the edge of the protector 40 and thus assure positive coaction between said protector and said arm 38. The arm 38 also is provided with a pair of spring-urged plungers 88 and 90 mounted in the bores 92 and 94, respectively, whereby to abut against the side of the transfer sleeve, maintaining the axes of the cylinder 28 and plunger 30 parallel with that of the transfer sleeve 36 and providing a secondary protector-engaging means to accommodate different sized transfer sleeves, said plungers being adapted to engage portions of the resilient protector which might otherwise, in the use of out-sized transfer sleeves, creep up between the sleeve and arm and bind the apparatus. It is to be noted that the outward movement of the plungers 88 and 90 is limited by the keys 96 and 98 engageable in slots 100 and 102 in the said plunger.

Figure 3:
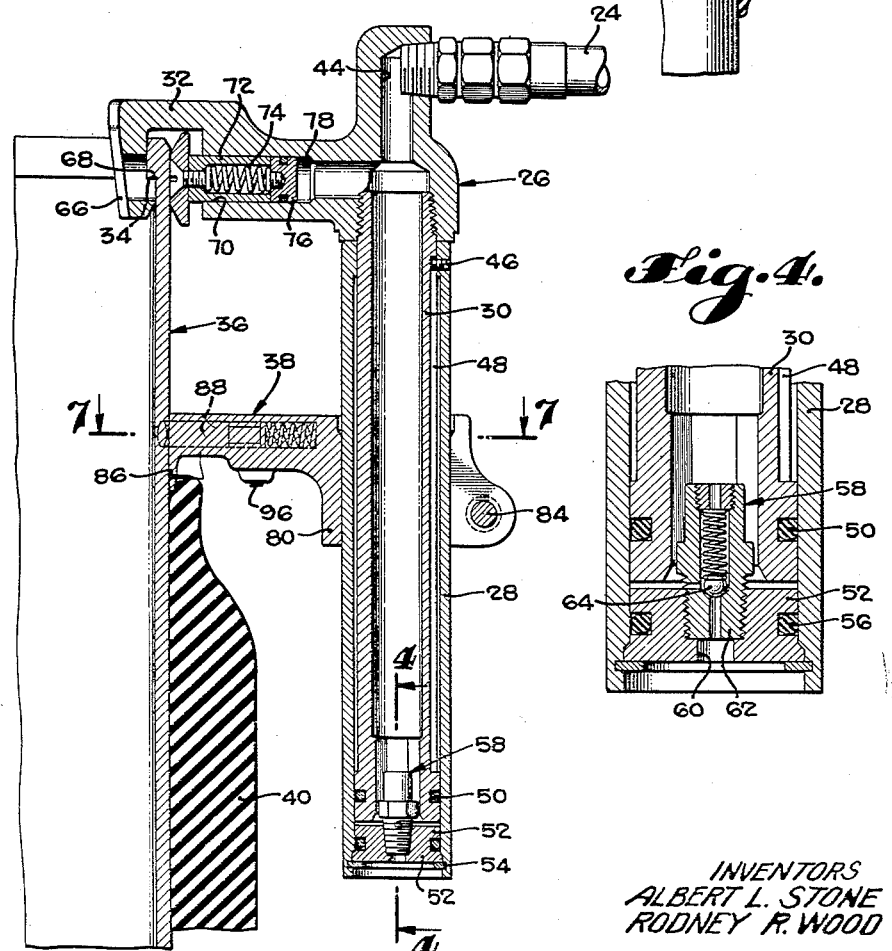
Figure 3 shows an enlarged longitudinal sectional view of said apparatus shown in the position assumed in Figure 1.
Figure 4:
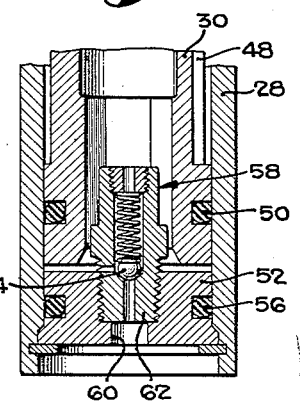
Figure 4 shows a longitudinal section taken on the line 4—4 of Figure 3.

In the operation of removing a protector 40 from a transfer sleeve 36 onto a pipe 42, the said transfer sleeve is ordinarily first placed about said pipe preferably somewhat adjacent a tool joint. The aforedescribed apparatus is then brought up to the transfer sleeve and the hooked portion 66 of the arm 32 hooked about the lip 34 of said transfer sleeve, the plunger 72 abutting resiliently against the transfer sleeve and aiding in holding the apparatus in its position with respect to the transfer sleeve. In this position of the apparatus, the protector-engaging arm 38 abuts the side of the transfer sleeve 36, and the plungers 88 and 90 assist in aligning the apparatus. Since there are ordinarily a number of protector-bearing transfer sleeves from which the protectors must be removed onto the drill pipe, it will be understood that the hereindescribed operation constitutes a continuous cycle, and ordinarily it will be found that each batch of protector-bearing transfer sleeves will have their protectors mounted in approximately the same place with respect to the upper lip 34 of said transfer sleeve. Occasionally, however, as with the introduction of a new batch of protector-bearing transfer sleeves, it will be found that the protectors are in different positions, and since it is desirable that before the application of fluid pressure the lip 86 of the arm 38 be closely adjacent or touching the protector, the bolt 84 may be loosened to slide the said arm 38 on the cylinder 28 to its proper position, as shown in Figures 1 and 3, preparatory to the application of fluid pressure.

Proper positioning of the apparatus having been accomplished, the operator presses upon the foot pedal 22 admitting fluid pressure into the bores 44 and 70 and into the hollow plunger 30. The fluid pressure accomplishes two things; first, clamping the plunger 72 hard against the transfer sleeve 36, whereby relative movement between the plunger 30 and transfer sleeve 36 is made impossible; and, second, sliding outwardly the cylinder 28 upon the plunger 30. Since the cylinder 28 carries the arm 38, the said arm 38 forces the protector outwardly on the transfer sleeve until the elasticity of the protector material snaps said protector over the end of the transfer sleeve and onto the drill pipe, it having been found in the operation of this device that abutment of the single arm 38 is sufficient to remove the protector. Immediately upon such removal of the protector onto the drill pipe, the operator releases the foot pedal 22, releasing the fluid pressure. The lip 86 of the arm 38 being free of the protector, and since no fluid pressure exists on the piston head 76, the entire apparatus may be pivoted around the lip 34 of the transfer sleeve and removed.

The embodiment shown in Figures 8 through 12 differs from the aforedescribed device in that it is adapted to be operated from a motor driven pump unit and therefore incorporates valve mechanism for controlling the fluid pressure within a modified head 104, the said modification having a cylinder 28, a hollow plunger 30, a retaining arm 32, protector-engaging arm 38 and like associated elements corresponding to the elements of the previously described embodiment.

The head 104, however, is provided with a chamber 106 having an outlet 108 to exit fluid to a conduit 110 leading to the pump unit. Communicating with said chamber 106 and thus the outlet 108 is a passageway 112 leading to a three-way valve designated generally 114, said valve 114 being housed within a chamber 115 in the head 104 transverse of the apparatus.

The three-way valve 114 comprises a slidable shuttle 116 having a decreased center cross-section portion providing an annular chamber 118 and being urged by a compression spring 120 away from the arm 32 of the apparatus. A multi-ported sleeve 122 is mounted in fixed position in said valve chamber 115 and is secured therein by a plug 124 bored to receive a valve stem 126 and held in place by a snap ring 128, the valve stem 126 carrying a push button 130. The sleeve 122 is sealed in the chamber 115 by the packing rings 132, which also partition the said chamber 115, and is provided with ports 134, 136, and 138 to provide communication between the annular chamber 118 and the chamber 115. Leading from the chamber 115 is a passageway 146 in the head 104, closed by a plug 148 and having a T-connection with an inlet 150 from which leads a conduit 152 connected to the pump unit and admitting fluid under pressure therefrom. Likewise leading from said chamber 115 is a passageway 140 communicating the chamber with a bore 142 in the arm 32, said bore communicating with the bore 70 in said arm and with the hollow interior of the plunger 30. The bore 142 is additionally provided with an exit plug 144.

Thus the shuttle 116 is normally urged by the spring 120 toward the push button 130 and the outlet 108 normally communicated through the passageway 112, the chamber 115, the ports 138, the chamber 118, the ports 136, and the passage 146 with the inlet 150 whereby fluid entering the inlet 150 is continuously circulated to and out of the outlet 108 when the device is not in operation, preventing heating up of the pressure fluid as would occur if the pump were permitted to operate continuously and the pressure fluid were by-passed back to the reservoir through the pressure relief valve ordinarily incorporated in the hydraulic unit.

A pressing of the push button 130, however, moves the shuttle 116 and communicates the inlet 150 through the passageway 146, chamber 115, the ports 136, the chamber 118, the ports 134, the passage 140 and the bore 142 with the interior of the plunger 30, resulting in the extension of the cylinder 28 and arm 38 and the clamping of the arm 32 onto the transfer sleeve 36, to perform the operation of removing the protector 40 as heretofore described.

It will be noted that between the chamber 106 in the head 104 and the hollow plunger 30 is provided a double acting check valve 154. The valve 154 comprises a plug 156 threaded into the head 104 and depending into the hollow plunger 30, said plug having an interior plug 158 threaded into itself, the two plugs 156 and 158 being bored to provide a valve chamber 160 in which floats a ball 162. Depending into the bore in the plug 158 is a valve stem 164 projecting through a bore in a plug 166 to a push button 170, said plug being sealed in the head 104 and retained in place by a snap ring 168. A spring 172 abuts a collar 174 on said valve stem and the extremities of the plugs 156 and 158, thus normally holding the valve stem 164 from engagement with the ball 162. It will be seen that when the push button 130 is depressed and communication maintained between the inlet 150 and the interior of the hollow plunger 30, the ball 162 is forced upwardly by fluid pressure to block communication between the interior of the hollow plunger 30 and the chamber 106 leading to the outlet 108. After extension of the cylinder 28 under fluid pressure, however, and the consequent removal of the protector 40 from the transfer sleeve 36, it will be of course necessary to retract the said cylinder 28. However, it will be noted that communication between the interior of the plunger 30 and the outlet 108 through the valve 114 is blocked by release of the push button 130 and consequent movement of the shuttle 116 by the action of the spring 120. Therefore, the push button 170 is pressed downwardly, and the valve stem 164 removes the ball 162 from its upper seat to permit the fluid to flow from within the hollow plunger 30 to the chamber 106 and out the outlet 108.

In the operation of the above described modification, the actual mechanical removing of the protector from the transfer sleeve is accomplished in the same way as with the prior described embodiment. However, the embodiment incorporating the three-way valve 114 possesses an added advantage in being operable with a motor driven fluid pressure unit, including a constant displacement pump. As with the first modification, the device is positioned on the transfer sleeve with the lip 86 of the arm 38 engaging or nearly engaging, through the adjustable feature of the said arm 38, the protector 40. During this operation, fluid is by-passed from the inlet 150 to the outlet 108 as previously described. It will be noted that during the circulation of fluid from the inlet 150 to the outlet 108 the pressure of said fluid will cause the ball 162 to seat in its lower seat, thus preventing the fluid from entering the interior of the hollow plunger 30 and causing creeping of the cylinder 28 due to the circulating fluid pressure. The operator may then press the push button 130, delivering fluid under pressure, as aforedescribed, to the hollow plunger 30 and to the bore 70 to extend the cylinder 28 and the arm 38 and to clamp the arm 32 about the transfer sleeve. Fluid pressure in the hollow plunger 30 will remove the ball 162 from its lower seat to its upper seat and thus seal off the hollow plunger 30 from the outlet 108. Immediately upon removal of the protector 40 to the drill pipe, the push button 130 is released and the push button 170 pressed. This communicates the interior of the hollow plunger 30 with the outlet 108 and permits retraction of the cylinder 28 and the arm 38 and additionally releases the pressure in the bore 70 and consequently the hard clamp of the plunger 72 on the transfer sleeve 36. As with the first embodiment, the assembly may thus be pivoted about the lip 34 of the said transfer sleeve, permitting easy removal of the device from said transfer sleeve.

It will be apparent from the foregoing description that the circumferential extent of application of axial force to the protector is confined to a minor segmental portion of the protector. It is only by reason of our conception of the idea of thus confining the application of force to the protector, that it became possible to provide the lightweight, easily manipulable, and fast operating device described hereinabove.

While there has been described what is at present considered the preferred embodiments of the present invention, it will be apparent to those skilled in the art that various modifications and changes may be made without departing from the essence of the invention, and it is intended to cover herein all such modifications and changes as come within the true scope and spirit of the appended claims.

We claim:

1. Apparatus for removing a drill pipe protector from a transfer sleeve having an inner lip, said apparatus comprising: an anchor member including a hooked extremity adapted to cooperate with said lip, a bore in said anchor member and a plunger slidable in said bore and adapted to abut against said transfer sleeve; a pusher member adapted to engage one end of said protector; a fluid-actuated assembly comprising cooperating piston and cylinder elements, said pusher member being connected to one of said elements and said anchor member being connected to the other element with said bore in communication with the interior of said cylinder, whereby upon application of fluid pressure to said assembly said plunger is clamped against said transfer sleeve and said pusher member is urged against said protector to force said protector from said transfer sleeve.

2. Apparatus as set forth in claim 1, wherein said anchor member is connected to said piston element, said piston element being hollow and said bore communicating with the interior of said hollow piston.

3. Apparatus for forcing an elastic drill pipe protector axially off a transfer sleeve and onto a pipe encompassed thereby, comprising; extensible force applying means having relatively rectilinearly movable members, anchor means carried by one of said members, pusher means carried by the other of said members, said anchor means and pusher means extending in the same direction laterally of the direction of relative movement of said members, said anchor means having a relatively small abutment surface adjacent the outer end thereof releaseably engageable with a cooperating abutment surface on the transfer sleeve, said pusher means having a relatively small surface adjacent the outer end thereof engageable with an end portion of said protector, means movably carried by said pusher means and resiliently urged inwardly into sliding engagement with said sleeve adjacent the end portion of said protector engaged by said pusher to prevent undue entry of said protector between said pusher means and said sleeve, said anchor and pusher means being substantially in alignment in the direction of relative movement of said members whereby said apparatus may be engaged with or disengaged from said sleeve and protector from one side and entirely within a narrow sector thereof.

References Cited in the file of this patent

UNITED STATES PATENTS

| Number | Name | Date |
|---|---|---|
| 961,375 | Seabrook | June 14, 1910 |
| 1,149,279 | Nelson | Aug. 10, 1915 |
| 1,524,753 | Schwerin | Feb. 2, 1925 |
| 1,700,101 | Smith | Jan. 22, 1929 |
| 1,705,789 | Steirly | Mar. 19, 1929 |
| 1,774,836 | Lormuller | Sept. 2, 1930 |
| 1,799,298 | Jacob | Apr. 7, 1931 |
| 1,889,915 | Cole | Dec. 6, 1932 |
| 2,014,535 | Maca | Sept. 17, 1935 |
| 2,135,278 | Countryman | Nov. 1, 1938 |
| 2,165,504 | Pfauser | July 11, 1939 |
| 2,183,842 | Mandl | Dec. 19, 1939 |
| 2,252,692 | Barnes et al. | Aug. 19, 1941 |
| 2,263,690 | Bradley | Nov. 25, 1941 |
| 2,291,976 | Minor | Aug. 4, 1942 |
| 2,294,506 | Long | Sept. 1, 1942 |
| 2,328,771 | Barnes | Sept. 7, 1943 |
| 2,355,997 | Mueller | Aug. 15, 1944 |
| 2,429,341 | Ballagh | Oct. 21, 1947 |
| 2,440,009 | Graham | Apr. 20, 1948 |
| 2,466,909 | Periman | Apr. 12, 1949 |
| 2,505,964 | Hincks | May 2, 1950 |
| 2,547,345 | Skilling | Apr. 3, 1951 |